(12) United States Patent
Wiederhoeft et al.

(10) Patent No.: US 9,254,809 B2
(45) Date of Patent: Feb. 9, 2016

(54) TEAR PREVENTER ON A SIDE AIR CUSHION OUTLET SEAM OF A VEHICLE SEAT COVERING AND VEHICLE SEAT COVERING WITH A TEAR PREVENTER

(75) Inventors: Wolfgang Wiederhoeft, Remscheid (DE); Hans Erber, Odenthal (DE); Christian Raubal, Neureichenau (DE)

(73) Assignee: Johnson Controls Technology Company, Street Holland, MI (US)

( * ) Notice: Subject to any disclaimer, the term of this patent is extended or adjusted under 35 U.S.C. 154(b) by 0 days.

(21) Appl. No.: 14/396,184

(22) PCT Filed: Apr. 23, 2012

(86) PCT No.: PCT/EP2012/057386
§ 371 (c)(1),
(2), (4) Date: Oct. 22, 2014

(87) PCT Pub. No.: WO2013/159805
PCT Pub. Date: Oct. 31, 2013

(65) Prior Publication Data
US 2015/0048601 A1 Feb. 19, 2015

(51) Int. Cl.
*B60R 21/207* (2006.01)
*B60R 21/2165* (2011.01)
*B60R 21/231* (2011.01)
*B60N 2/58* (2006.01)

(52) U.S. Cl.
CPC .............. *B60R 21/2165* (2013.01); *B60N 2/58* (2013.01); *B60R 21/207* (2013.01); *B60R 21/23138* (2013.01); *B60N 2002/5808* (2013.01); *B60R 2021/2076* (2013.01); *B60R 2021/23146* (2013.01)

(58) Field of Classification Search
CPC .... B60N 2002/5808; B60N 2/58; B60N 2/60; B60R 21/207; B60R 21/2165; B60R 21/215; B60R 21/23138
USPC ....................................................... 280/730.2
See application file for complete search history.

(56) References Cited

U.S. PATENT DOCUMENTS

2010/0025970 A1 * 2/2010 Paruszkiewicz et al. .. 280/728.3

FOREIGN PATENT DOCUMENTS

| DE | 297 04 593 U1 | 5/1997 | |
|----|---|---|---|
| DE | 197 46 387 A1 | 4/1998 | |
| DE | 19727746 A1 * | 1/1999 | ............... B60N 2/44 |
| DE | 696 01 699 T2 | 10/1999 | |
| DE | 198 31 462 A1 | 1/2000 | |
| DE | 10238909 C1 * | 10/2003 | ............... B60N 2/58 |
| DE | 102 54 723 A1 | 6/2004 | |
| DE | 10 2004 003 983 B3 | 12/2004 | |
| DE | 102004044715 A1 * | 4/2006 | |
| DE | 10 2007 050 274 A1 | 1/2009 | |
| DE | 102008063486 B3 * | 6/2010 | |
| DE | 10 2009 006 732 A1 | 8/2010 | |

(Continued)

*Primary Examiner* — Keith Frisby
(74) *Attorney, Agent, or Firm* — McGlew and Tuttle, P.C.

(57) ABSTRACT

A tear preventer (2, 3) is provided on a side air cushion outlet seam (4) of a vehicle seat covering (5) for a vehicle seat (1). In each case a fabric tube (16) is arranged on an inner side of the vehicle seat covering(s) on the two seam ends of the side air cushion outlet seam (4) and is connected in a materially joined and/or frictionally locking fashion to the vehicle seat cover (5). Furthermore, a vehicle seat cover (5) is provided having a tear preventer (2, 3) on a side air cushion outlet seam (4).

20 Claims, 3 Drawing Sheets

(56) References Cited

FOREIGN PATENT DOCUMENTS

| | | | | |
|---|---|---|---|---|
| FR | 2760701 A1 | * | 9/1998 | ............... B60N 2/44 |
| FR | 2772699 A1 | * | 6/1999 | |
| FR | 2889493 A1 | * | 2/2007 | ............ B60R 21/207 |
| JP | 09323606 A | * | 12/1997 | ............... B60R 21/20 |
| WO | 2009/120754 A1 | | 10/2009 | |

* cited by examiner

TEAR PREVENTER ON A SIDE AIR CUSHION OUTLET SEAM OF A VEHICLE SEAT COVERING AND VEHICLE SEAT COVERING WITH A TEAR PREVENTER

CROSS REFERENCE TO RELATED APPLICATIONS

This application is a United States National Phase Application of International Application PCT/EP2012/057386 filed Apr. 23, 2012, the entire contents of which is incorporated herein by reference.

FIELD OF THE INVENTION

The invention relates to a tear preventer on a side air cushion outlet seam of a vehicle seat covering. The invention further relates to a vehicle seat covering with a tear preventer on a side air cushion (air bag) outlet seam.

BACKGROUND OF THE INVENTION

In the prior art, a fabric adhesive tape is arranged at both ends of a side air cushion outlet seam of a vehicle seat covering. The fabric adhesive tape has an open fabric edge which faces in the direction of the side air cushion outlet seam.

DE 297 04 593 U1 discloses vehicle seat coverings which are able to be attached to the cushions of the rear and front seats of passenger motor vehicles, consisting of backrest parts and seat parts, wherein on their sides facing the vehicle doors the backrest parts and/or seat parts of the coverings have predetermined rupture points for side airbags located in the backrest and/or the seat.

WO 2009/120 754 A1 discloses a vehicle seat, the covering thereof at least partially having through-openings which are closed by means of an adhesive tape.

DE 10 2004 003 983 B3 discloses a frangible seam configuration in the covering of a motor vehicle seat provided with an airbag. In this case, a frangible seam configuration is provided with frangible seams which intersect one another and which connect the covering parts together, rivets to be positioned in the intersecting region of the seams in said frangible seam configuration not producing any local increase in the strength of the seam. The rivets of the frangible seams in the intersecting region are placed in each case only in one of the relevant covering parts.

DE 102 54 723 A1 discloses a passenger protection device on a vehicle seat, in particular of a motor vehicle, with an airbag outlet opening seam configured in an airbag outlet region of a seat covering of a vehicle seat, wherein the seat covering has a visible face facing the vehicle interior and a seat covering rear face remote from the vehicle interior, and in the non-activated initial state at least one airbag is arranged folded up behind the seat covering. In the activated state of the passenger protection device, the at least one airbag is able to be inflated and by opening the airbag outlet opening seam is able to be inflated in the vehicle interior through the outlet opening formed in the airbag outlet region. In this case, at least one component of the airbag outlet opening seam is indirectly or directly coupled to at least one displacement device, preferably a traction means. In the activated state of the passenger protection device, the displacement device displaces at least the component of the airbag outlet opening seam away from the airbag outlet region so that the seam structure is at least partially broken up and thus the opening force to be applied for opening the airbag outlet opening is reduced.

DE 696 01 699 T2 discloses a side airbag device for mounting in the side of a vehicle seat facing the passenger compartment wall, wherein the seat covering material in the vicinity of an airbag housing opening has a seam part where the covering material covering the opening and a further covering material are stitched together, wherein this seam part is able to be torn at a predetermined deployment pressure in the airbag, and wherein a tape extends between the further covering material on the seam part and a fixed element, namely a seat frame, for preventing the expansion of the further covering material when the airbag is triggered, wherein one end of the tape is fastened to the fixed element and the other end is stitched to the further covering material with the sewing threads of the seam part.

DE 197 46 387 A1 discloses an airbag module accommodated in a module housing. The airbag module is arranged inside a seat back of a seat of a motor vehicle and the cover of the module housing is opened by the pressure of an airbag which bursts open in the event of a side collision of the motor vehicle in order to deploy the airbag from the cover into the passenger compartment of the vehicle. Even if the cover is not able to be opened if it is pushed down by a door deformed by the impact of the collision, tear lines formed in a housing body of the module housing are ruptured in order to pivot a front wall of the housing body in the direction of the front of the vehicle. Thus, the airbag is able to be deployed without hindrance from the front wall part of the housing body into the passenger compartment.

DE 198 31 462 A1 discloses an internal trim part, in particular for a side door of a passenger motor vehicle, provided with side impact protection (airbag). The internal trim part comprises a support body with a cutout which is covered by a shaped foam part. The support body bears a foam support also covering the shaped foam part, which in turn is covered by a decorative skin. The decorative skin is in two parts and the decorative skin parts are connected together via a tear seam. The tear seam forms a predetermined tearing point extending transversely over the cutout, said predetermined tearing point also being provided in the foam parts. The particularity of the internal trim part consists in the sealing of the seam by means of a sealing strip extending over the entire extent of the seam and the one-piece configuration of the shaped part and foam support by applying foam to the space between the support body and the decorative skin.

SUMMARY OF THE INVENTION

It is an object of the present invention to provide a tear preventer on a side air cushion outlet seam of a vehicle seat covering for a vehicle seat which is improved and, in particular, less expensive and more effective relative to the prior art and a vehicle seat covering with a tear preventer on a side air cushion outlet seam and a method for the production thereof.

In the tear preventer on a side air cushion outlet seam of a vehicle seat covering for a vehicle seat according to the invention, in each case a fabric tube is arranged on an inner face of the vehicle seat covering on the two seam ends of the side air cushion outlet seam and is connected by a positive, material and/or non-positive connection to the vehicle seat covering. In this manner, a defined tearing of the side air cushion outlet seam is permitted as far as the fabric tubes at the two seam ends.

Particularly advantageously, the fabric tube is stitched by means of at least one additional seam to the vehicle seat covering. As a result, a particularly secure and firm retention of the fabric tube on the vehicle seat cover is permitted.

In an advantageous embodiment, the fabric tube is arranged with its longitudinal extent in the transverse direction relative to the longitudinal extent of the side air cushion outlet seam. Thus, the portion of the fabric tube oriented in the direction of the seam ends of the side air cushion outlet seam does not have an open fabric edge, whereby the tear preventer formed by the fabric tube is particularly resistant.

In a particularly advantageous embodiment, the fabric tube is configured to be seamless. Thus, the fabric tube in the peripheral direction has no seams which could potentially decrease or reduce the tear resistance.

The side air cushion outlet seam is preferably arranged in the region of a backrest side element of the vehicle seat and extends substantially vertically along the backrest side element of the vehicle seat.

In a further advantageous embodiment, the side air cushion outlet seam is configured as a predetermined tear seam which, when a side air cushion is being deployed, permits the deploying side air cushion to pass through the torn side air cushion outlet seam of the vehicle seat covering. As a result, the side air cushion is able to deploy its designated effect on the seat occupant.

According to the invention, in the vehicle seat covering with a tear preventer on a side air cushion outlet seam, in each case a fabric tube is arranged on an inner face of the vehicle seat covering at the end of a side air cushion outlet seam by a positive, material and/or non-positive connection. As a result, a defined tearing of the side air cushion outlet seam is permitted as far as the tear preventer which is formed by the fabric tubes at the two seam ends.

According to the invention, in the method for producing a tear preventer on a side air cushion outlet seam of a vehicle seat covering, in each case a fabric tube is arranged on an inner face of the vehicle seat covering at the end of a side air cushion outlet seam by a positive, material and/or non-positive connection.

The invention is described in more detail with reference to the accompanying schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
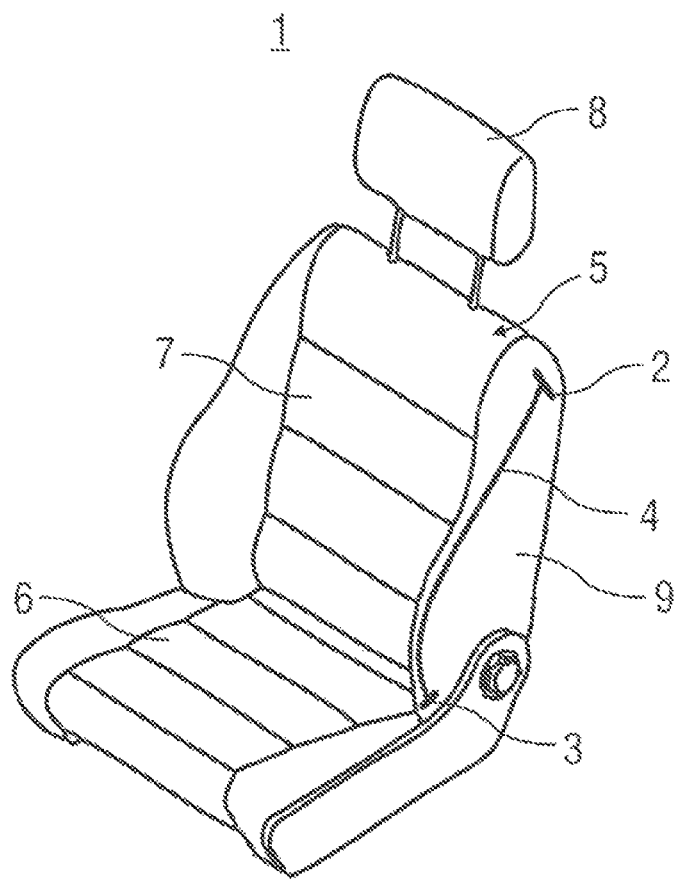
FIG. 1 is a schematic view showing a vehicle seat with a tear preventer on a side air cushion outlet seam of a vehicle seat covering.

Parts which correspond to one another are provided in all of the Figures with the same reference numerals.

In FIG. 1, a vehicle seat 1 with an upper tear preventer 2 and a lower tear preventer 3 on a side air cushion outlet seam 4 of a vehicle seat covering 5 are shown schematically. Such a side air cushion outlet seam 4 is also denoted as the SAB (Side Air Bag) seam. The vehicle seat 1 is a vehicle seat which comprises at least one seat surface 6, a seat back 7 and a head restraint 8.

The side air cushion outlet seam 4 is arranged in the region of a backrest side element 9 of the vehicle seat 1 and extends substantially vertically along the backrest side element 9 of the vehicle seat 1. Behind the side air cushion outlet seam 4 a side air cushion, not shown, is arranged in the backrest side element 9, said side air cushion being deployed through the side air cushion outlet seam 4 when triggered as a result of an accident.

To this end, the side air cushion outlet seam 4 is configured as a conventional predetermined tear seam which, when the side air cushion is being deployed, permits the deploying side air cushion to pass through the torn side air cushion outlet seam 4 of the vehicle seat covering 5.

Figure 2:
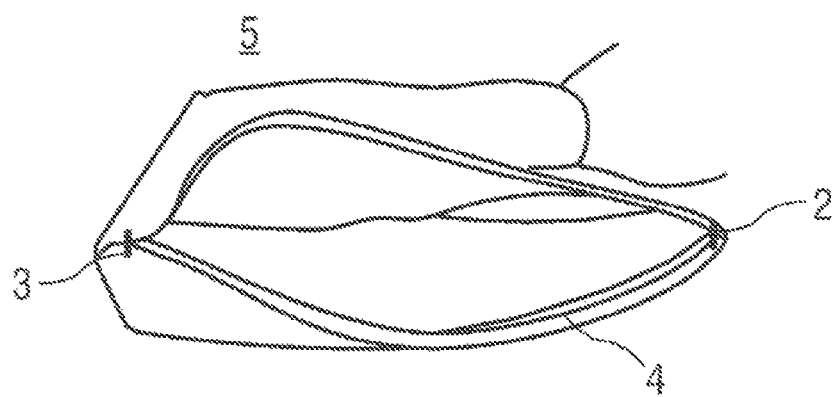
FIG. 2 is a schematic view showing a vehicle seat covering with a torn side air cushion seam.

In FIG. 2, a vehicle seat covering 5 with a side air cushion outlet seam 4 torn by triggering the side air cushion is shown schematically.

In each case a tear preventer 2, 3 is arranged at the end on the two seam ends of the side air cushion outlet seam 4. This tear preventer 2, 3 is intended to prevent uncontrolled tearing of the vehicle seat covering 5 beyond the side air cushion outlet seam 4. To this end, in the prior art, a fabric adhesive tape portion 10 is arranged at the end of the side air cushion outlet seam 4.

Figure 3:
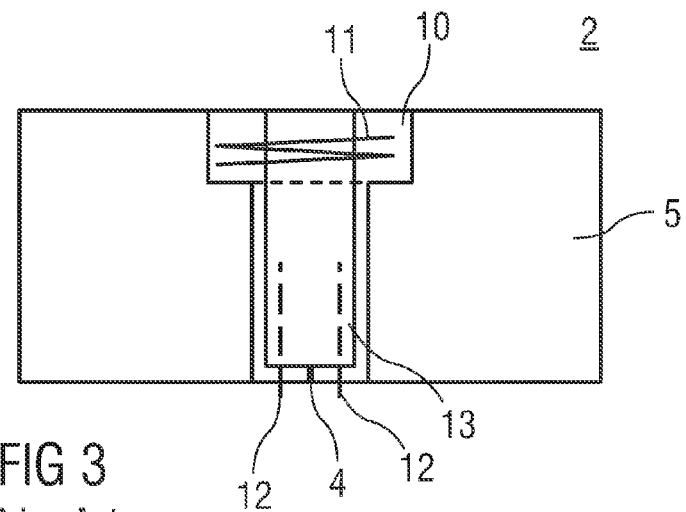
FIG. 3 is a schematic view showing an upper tear preventer on a side air cushion outlet seam of a vehicle seat covering according to the prior art.
Figure 4:
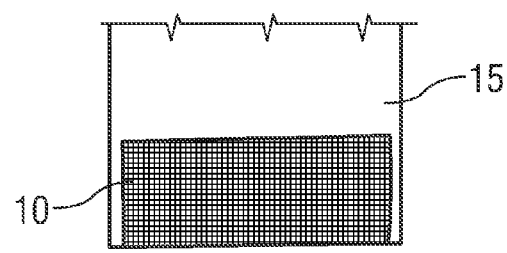
FIG. 4 is a schematic view showing a fabric adhesive tape portion according to the prior art.

In FIG. 3, such an upper tear preventer 2 on the side air cushion outlet seam 4 of the vehicle seat covering 5 according to the prior art is shown schematically. A fabric adhesive tape portion 10, shown in more detail in FIG. 4, is arranged by means of a zig-zag seam 11 on the inside of the vehicle seat covering 5. In this case, the fabric adhesive tape portion 10 is fastened in the extension of a double seam 12, which fastens a perforated fabric tape portion 13 of the side air cushion outlet seam 4 to the vehicle seat covering 5. Thus, an open fabric edge of the fabric adhesive tape portion 10 faces in the direction of the side air cushion outlet seam 4, which may tear when loads are applied. As a result, the tear preventer 2 is weakened and does not withstand the forces acting under all of the operating conditions which occur.

The perforated fabric tape portion 13 fastened by means of the double seam 12 on both sides of the side air cushion outlet seam 4 forms the predetermined tear seam for the side air cushion.

The fabric adhesive tape portion 10 is delivered in portions cut to length, which are applied to a carrier film 15.

Figure 5:
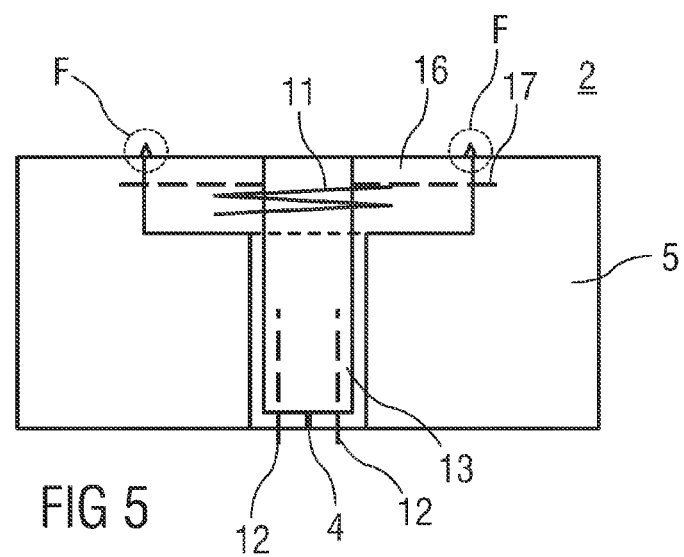
FIG. 5 is a schematic view showing an upper tear preventer according to the invention on a side air cushion outlet seam of a vehicle seat covering.

FIG. 5 shows schematically the upper tear preventer 2 according to the invention on the side air cushion outlet seam 4 of the vehicle seat covering 5. In this case, a fabric tube 16 is arranged in the extension of the double seam 12 and fastened by means of the zig-zag seam 11 inside on the vehicle seat covering 5. Additionally, the fabric tube 16 is stitched by means of one respective additional seam 17 to the vehicle seat covering 5 on both sides of the side air cushion outlet seam 4.

The fabric tube is connected to the vehicle seat covering 5 via a material, form-fitting connection and/or a force-fitting connection F.

The fabric tube 16 is arranged with its longitudinal extent in the transverse direction relative to the longitudinal extent of the side air cushion outlet seam 4. As a result, the portion of the fabric tube 16 which is oriented in the direction of the seam ends of the side air cushion outlet seam 4 has no open fabric edge, and as a result the tear preventer 2 formed by the fabric tube 16 is particularly resistant.

Figure 6:
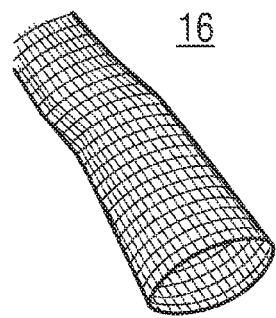
FIG. 6 is a schematic view showing a fabric tube.

In FIG. 6 the fabric tube 16 is shown schematically. In a particularly advantageous embodiment, the fabric tube 16 is configured to be seamless. Thus, the fabric tube 16 has no seams at all in the peripheral direction, the presence of seams being able to decrease or reduce its tear resistance.

Figure 7:
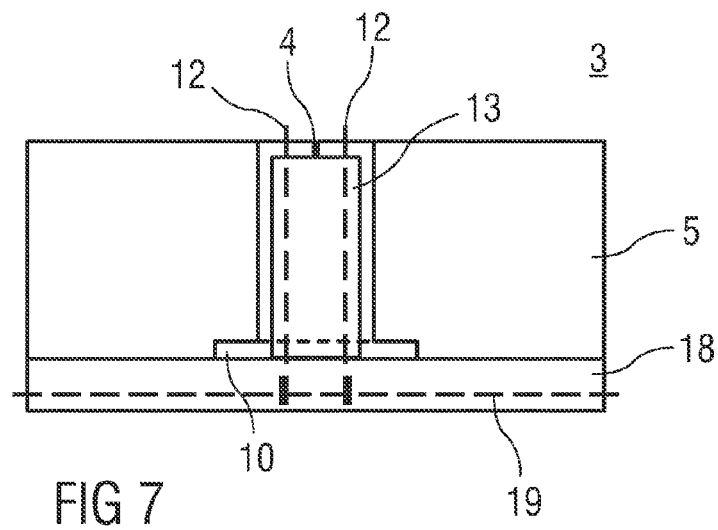
FIG. 7 is a schematic view showing a lower tear preventer on a side air cushion outlet seam of a vehicle seat covering according to the prior art.

In FIG. 7, a lower tear preventer 3 on the side air cushion outlet seam 4 of the vehicle seat covering 5 according to the prior art is shown schematically. The fabric adhesive tape portion 10 is arranged in the folded-over portion 18 of the vehicle seat covering 5 and fastened by means of the folded seam 19 and the double seam 12 to the vehicle seat covering 5. Thus, an open fabric edge of the fabric adhesive tape portion 10 faces in the direction of the side air cushion outlet seam 4 which may tear when loads are applied. As a result, the lower tear preventer 3 is weakened and does not withstand the forces acting under all of the operating conditions which occur.

Figure 8:
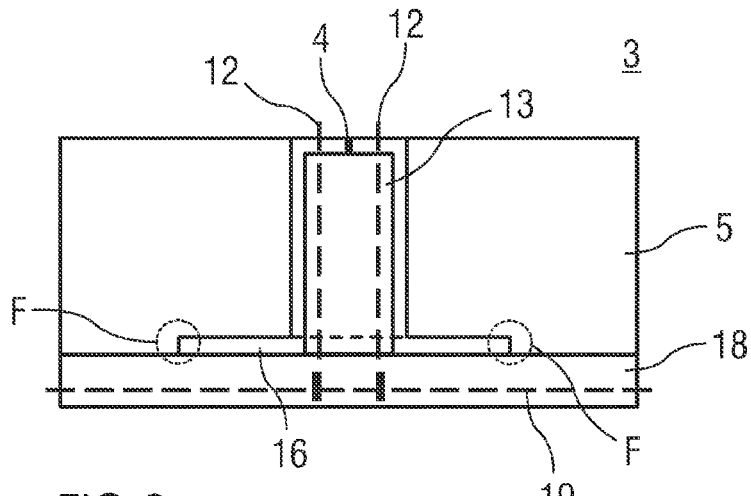
FIG. 8 is a schematic view showing a lower tear preventer according to the invention on a side air cushion outlet seam of a vehicle seat covering.

FIG. 8 shows schematically the lower tear preventer 3 according to the invention on the side air cushion outlet seam 4 of the vehicle seat covering 5. In this case, the fabric adhesive tape portion 10 is replaced by the fabric tube 16. Thus, the fabric tube 16 is arranged in the folded-over portion 18 of the vehicle seat covering 5 and fastened by means of the folded seam 19 and the double seam 12 to the vehicle seat covering 5. In this case, the fabric tube 16 is arranged with its longitudinal extent in the transverse direction relative to the longitudinal extent of the side air cushion outlet seam 4, and as a result no open fabric edge of the fabric tube 16 faces in the direction of the side air cushion outlet seam 4.

While specific embodiments of the invention have been shown and described in detail to illustrate the application of the principles of the invention, it will be understood that the invention may be embodied otherwise without departing from such principles.

The invention claimed is:

1. A tear preventer on a side air cushion outlet seam of a vehicle seat covering for a vehicle seat, the tear preventer comprising:
   a fabric tube is arranged on an inner face of the vehicle seat covering on each of two seam ends of the side air cushion outlet seam, the fabric tubes being connected in at least one of a material, form-fitting manner and a force-fitting manner to the vehicle seat covering.

2. A tear preventer as claimed in claim 1, further comprising at least one additional seam wherein the fabric tube is stitched by the at least one additional seam to the vehicle seat covering.

3. A tear preventer as claimed in claim 1, wherein:
   the side air cushion outlet seam has a side air cushion outlet seam longitudinal extent;
   the fabric tube has a fabric tube longitudinal extent; and
   the fabric tube is arranged with the fabric tube longitudinal extent extending in a transverse direction relative to the side air cushion outlet seam longitudinal extent.

4. A tear preventer as claimed in claim 1, wherein the fabric tube is configured to be seamless.

5. A tear preventer as claimed in claim 1, wherein the side air cushion outlet seam is arranged in a region of a backrest side element of the vehicle seat.

6. A tear preventer as claimed in claim 1, wherein the side air cushion outlet seam extends substantially vertically along a backrest side element of the vehicle seat.

7. A tear preventer as claimed in claim 1, wherein the side air cushion outlet seam is configured as a predetermined tear seam which, when a side air cushion is being deployed, permits the deploying side air cushion to pass through the torn side air cushion outlet seam of the vehicle seat covering.

8. A vehicle seat covering comprising:
   a vehicle seat covering inner face;
   a side air cushion outlet seam;
   a tear preventer on a side of the air cushion outlet seam, the tear preventer comprising a fabric tube arranged on the vehicle seat covering inner face at each of two ends of the side air cushion outlet seam and connected thereto in a material, form-fitting manner and a force-fitting manner.

9. A vehicle seat covering as claimed in claim 8, further comprising at least one additional seam wherein the fabric tube is stitched by the at least one additional seam to the vehicle seat covering.

10. A vehicle seat covering as claimed in claim 8, wherein:
    the side air cushion outlet seam has a side air cushion outlet seam longitudinal extent;
    the fabric tube has a fabric tube longitudinal extent; and
    the fabric tube is arranged with fabric tube longitudinal extent extending in a transverse direction relative to the side air cushion outlet seam longitudinal extent.

11. A vehicle seat covering as claimed in claim 8, wherein the fabric tube is configured to be seamless.

12. A vehicle seat covering as claimed in claim 8, wherein the side air cushion outlet seam is arranged in a region of a backrest side element of the vehicle seat.

13. A vehicle seat covering as claimed in claim 8, wherein the side air cushion outlet seam extends substantially vertically along a backrest side element of the vehicle seat.

14. A vehicle seat covering as claimed in claim 8, wherein the side air cushion outlet seam is configured as a predetermined tear seam which, when a side air cushion is being deployed, permits the deploying side air cushion to pass through the torn side air cushion outlet seam of the vehicle seat covering.

15. A vehicle seat comprising:
    a vehicle seat covering with an inner face;
    a side air cushion outlet seam;
    a tear preventer on a side of the air cushion outlet seam, the tear preventer comprising a fabric tube arranged on the vehicle seat covering inner face at each of two ends of the side air cushion outlet seam and connected thereto in a material, form-fitting manner and a force-fitting manner.

16. A vehicle seat as claimed in claim 15, further comprising at least one additional seam wherein the fabric tube is stitched by the at least one additional seam to the vehicle seat covering.

17. A vehicle seat as claimed in claim 15, wherein:
    the side air cushion outlet seam has a side air cushion outlet seam longitudinal extent;
    the fabric tube has a fabric tube longitudinal extent; and
    the fabric tube is arranged with the fabric tube longitudinal extent extending in a transverse direction relative to the side air cushion outlet seam longitudinal extent.

18. A vehicle seat as claimed in claim 15, wherein the fabric tube is seamless.

19. A vehicle seat as claimed in claim 15, wherein the side air cushion outlet seam is arranged in a region of a backrest side element of the vehicle seat.

20. A vehicle seat as claimed in claim 15, further comprising:
- a seat portion;
- a backrest portion comprising a backrest side element, wherein:
- the side air cushion outlet seam extends substantially vertically along the backrest side element; and
- the side air cushion outlet seam is configured as a predetermined tear seam which, when a side air cushion is being deployed, permits the deploying side air cushion to pass through the torn side air cushion outlet seam of the vehicle seat covering.

\* \* \* \* \*